July 24, 1923. Re. 15,662
C. H. VEEDER
OPERATING DEVICE FOR VOTING MACHINE REGISTERS, ETC
Original Filed Oct. 23, 1919
Fig. 1.
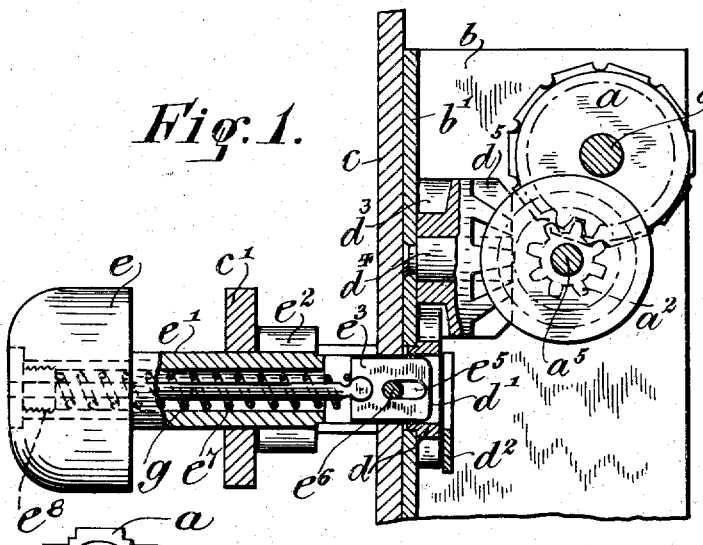
Fig. 2.
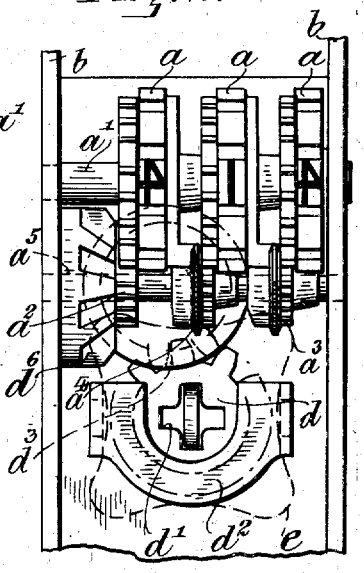
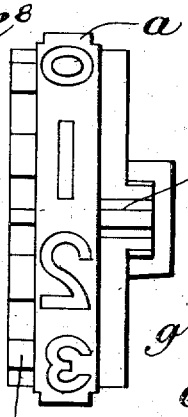
Fig. 5.
Fig. 3.
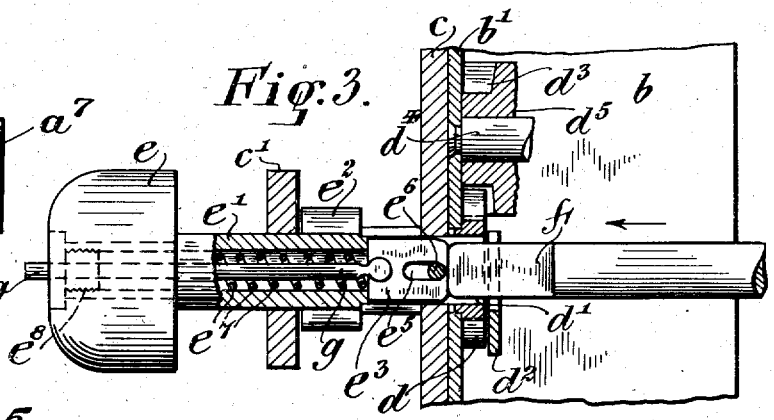
Fig. 4.
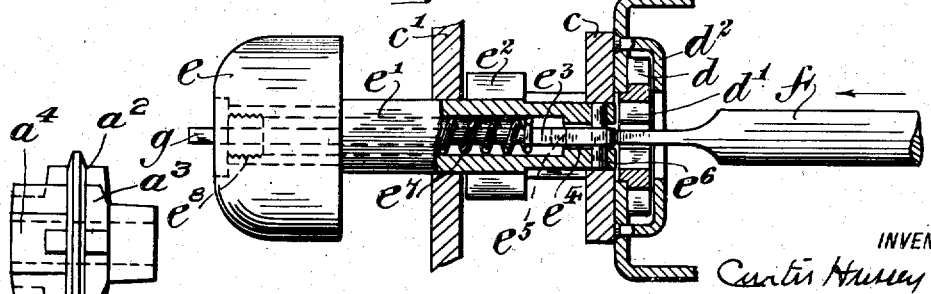
Fig. 6.
INVENTOR
Curtis Hussey Veeder
BY
Redding & Greeley
ATTORNEYS Reissued July 24, 1923. Re. 15,662

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

OPERATING DEVICE FOR VOTING-MACHINE REGISTERS, ETC.

Original No. 1,342,476, dated June 8, 1920, Serial No. 332,580, filed October 23, 1919. Application for reissue filed September 12, 1922. Serial No. 587,861.

*To all whom it may concern:*

Be it known that I, CURTIS HUSSEY VEEDER, a citizen of the United States, residing in the city of Hartford, in the State of Connecticut, have invented certain new and useful Improvements in Operating Devices for Voting-Machine Registers, Etc., of which the following is a specification, reference being had to the accompanying drawing, forming a part hereof.

In a voting machine there is a register or counting device for each candidate and each question submitted and all of the registers or counting devices must be set to zero after each election in order that the machine may be in readiness for the next election. As there are usually many such registers to be set to zero and as it is impracticable, because of the interlocking devices which prevent the free manipulation of the voters' operating device, to use the voters' operating device for the purpose of setting the register to zero, it is usually necessary to disconnect the voters' operating device from the register and thereafter to effect the re-setting of the register to zero by direct rotation of the number wheels by the application of the fingers thereto. This operation of re-setting, as usually performed, requires a great deal of time. Furthermore, the construction of the operating and disconnecting devices has been such that some of the parts are too light and weak to withstand repeated use satisfactorily and that the disconnected gears do not always return to proper engagement, with the result that the voting machine does not always operate accurately and that the gears are frequently broken. The object of this invention is so to improve the operating and disconnecting devices as to permit a more rugged construction to be used, to permit the re-setting of each register to zero to be effected rapidly, and to cause the failure of the disconnected parts to return to proper position and engagement to be indicated at the front of the machine so that the inspector may know, before the voting is commenced, whether the machine is completely ready for use. In accordance with the invention, the voters' operating device or knob is permitted to remain permanently in position and while normally in operating connection with the driving gear of the register, is disconnected therefrom by the introduction from the rear face of the machine of a suitable implement, by means of which the re-setting of the register can be effected readily and quickly. Furthermore, there is provided an indicator device which indicates at the front of the machine whether the voters' operating device or knob is operatively connected with the register. The invention will be more fully explained hereinafter with reference to the accompanying drawings in which it is illustrated and in which—

Figure 1 is a view partly in vertical section and partly in elevation of a portion of a voting machine including the register, the operating device and the intermediate mechanism.

Figure 2 is a view of the same in elevation, as seen from the right hand in Figure 1.

Figure 3 is a partial view similar to Figure 1, but showing in operating position an implement by which the voters' operating device or knob is disconnected from the register and by which the register can be actuated in the re-setting operation.

Figure 4 is a view similar to Figure 3 from a point of view at right angles to that of Figure 3.

Figures 5 and 6 are detail views, in elevation and on a larger scale, of one of the number wheels, with its transmitting gears, and of the transmitting pinion.

The register or counting device with which the improved operating mechanism is to be used may be of any usual or suitable construction. As shown in the drawings, it comprises a series of number wheels $a$, mounted upon a fixed shaft $a'$ and driven in the usual manner by a pinion $a^2$ and transferring devices $a^3$ and $a^4$, all mounted on a fixed shaft or spindle $a^5$. The gear $a^6$ of each number wheel of lower denomination meshes with the toothed wheel $a^3$ of the transmission pinion and the mutilated or single toothed member $a^4$ of the transmission pinion in turn co-operates with the mutilated member $a^7$ of the number wheel of next higher denomination, so that as each number wheel of lower denomination completes a rotation, the number wheel of the next higher denomination is advanced through one space. Such register or counting device is suitably supported within the front or voters' side of the voting machine and is accessible only from the rear for the purpose of permitting the record to be taken off and of permitting the register to be re-set to zero in readiness for a subsequent election. As shown, the register or counting device has its two shafts $a'$ and $a^5$ mounted in the side walls $b$ of a channel bar or open casing, the front wall $b'$ of which lies against a plate $c$ which forms the front or voters' wall of the voting machine. A driving gear $d$, provided with a slotted driving aperture, as at $d'$, has a bearing in the plate $b'$ and is held in place by a bracket $d^2$, being accessible for engagement by the voting knob from the front and by a re-setting implement from the rear. Motion is transmitted from the driving gear $d$ to the pinion $a^2$ of the register by gearing suited to the locking of the register. As shown, the gear $d$ meshes with a pinion $d^3$ which is mounted on a spindle $d^4$ secured to the plate $d'$ and has formed therewith a bevel gear $^5$ which meshes with a bevel gear $d^6$ mounted on the shaft or spindle $a^5$ and having the pinion $a^2$ of the register secured thereto. The voters' knob or driver $e$, by which the register is actuated, has a shank $e'$ which is mounted in the front wall $c$ and in a bar $c'$ and is provided as usual with a star wheel $e^2$ for co-operation with the usual locking device (not shown) by which the knob is limited to a single movement for each voter.

In order to permit the re-setting of the register from the rear of the voting machine, it is necessary to disconnect the voters' knob or driver from the register, so that the re-setting of the register shall not be interfered with by the locking device which co-operates with the knob. It has been usual to effect such disconnection by separating two of the gears of the train of gearing between the knob and the register. This increases the cost of construction, reduces the certainty of operation and sometimes results in breakage of parts, through the failure of the separated gears to be brought into mesh properly after the re-setting has been effected. Moreover, it makes the operation of re-setting slow and troublesome. In accordance with the present invention, however, the voters' knob is provided with a driving member $e^3$ which is mounted yieldingly in the shank of the knob, so that, although it normally engages the driving gear $d$, as shown in Figure 1, it can be thrust out of such engagement by the introduction from the rear of a re-setting implement indicated at $f$. The driving member $e^3$ is mounted in a slot $e^4$ formed in the inner end of the shank $e'$ of the knob and is itself slotted, as at $e^5$, to receive a pin $e^6$ which retains the driving member in place and limits its movement. The driving member is pressed forward by a spring $e^7$ which is mounted in the bore of the shank $e'$ and is held in place by a screw plug indicated by broken lines at $e^8$.

Normally, the driving member $e^3$ is in driving engagement with the driving gear $d$ and the operation of the knob $e$ by the voter effects a forward movement of the register. When, however, the vote has been completed and the record taken and it is desired to re-set all of the registers of the voting machine to zero, the voting machine is opened at the rear and the proper official introduces an implement $f$ into each driving gear $d$ in succession and rotates the gear so as to cause all of the number wheels of the register to be re-set to zero. For convenience and rapid operation the re-setting implement may be held and driven by an ordinary small geared hand-drill. It will be understood that when the driving member $e^3$ has been thrust back by the introduction of the re-setting implement, its movement is limited and the re-setting implement rotates against the end of the driving member without entering the slot in the shank of the voters' knob, so that the knob is undisturbed during the re-setting operation.

In order that any possible failure of the driving member to engage properly the driving gear, after the re-setting operation has been completed, may be indicated and the knob rotated sufficiently to bring about such engagement, the driving member $e^3$ is provided with an indicating device, such as the pin $g$, which is mounted in the bore of the shank $e^7$ and in a central bore of the screw plug $e^8$, so that, when the driving member $e^3$ is out of engagement with the driving gear $d$, the end of the pin $g$ will be projected beyond the knob, as shown in Figures 3 and 4, thereby indicating to the inspector or other official the fact that the driving member is not properly engaged with the driving gear.

It will be understood that various changes in details of construction may be made to suit different conditions of use.

I claim as my invention:

1. The combination with a register, and gearing for operating the same, including a gear having a driving aperture, of an operating knob supported in fixed position and a spring pressed driving member carried by the knob and normally in engagement with the driving aperture of said gear and movable out of such engagement by an implement introduced from the opposite side of the driving gear.

2. The combination with a register, and gearing for operating the same, including a gear having a driving aperture, of an operating knob supported in fixed position, a spring pressed driving member carried by the knob and normally in engagement with the driving aperture of said gear and movable out of such engagement by an implement introduced from the opposite side of the gear, and an indicator pin in operative connection with the driving member.

This specification signed this 2 day of September, 1922.

CURTIS HUSSEY VEEDER.